Figure 1:
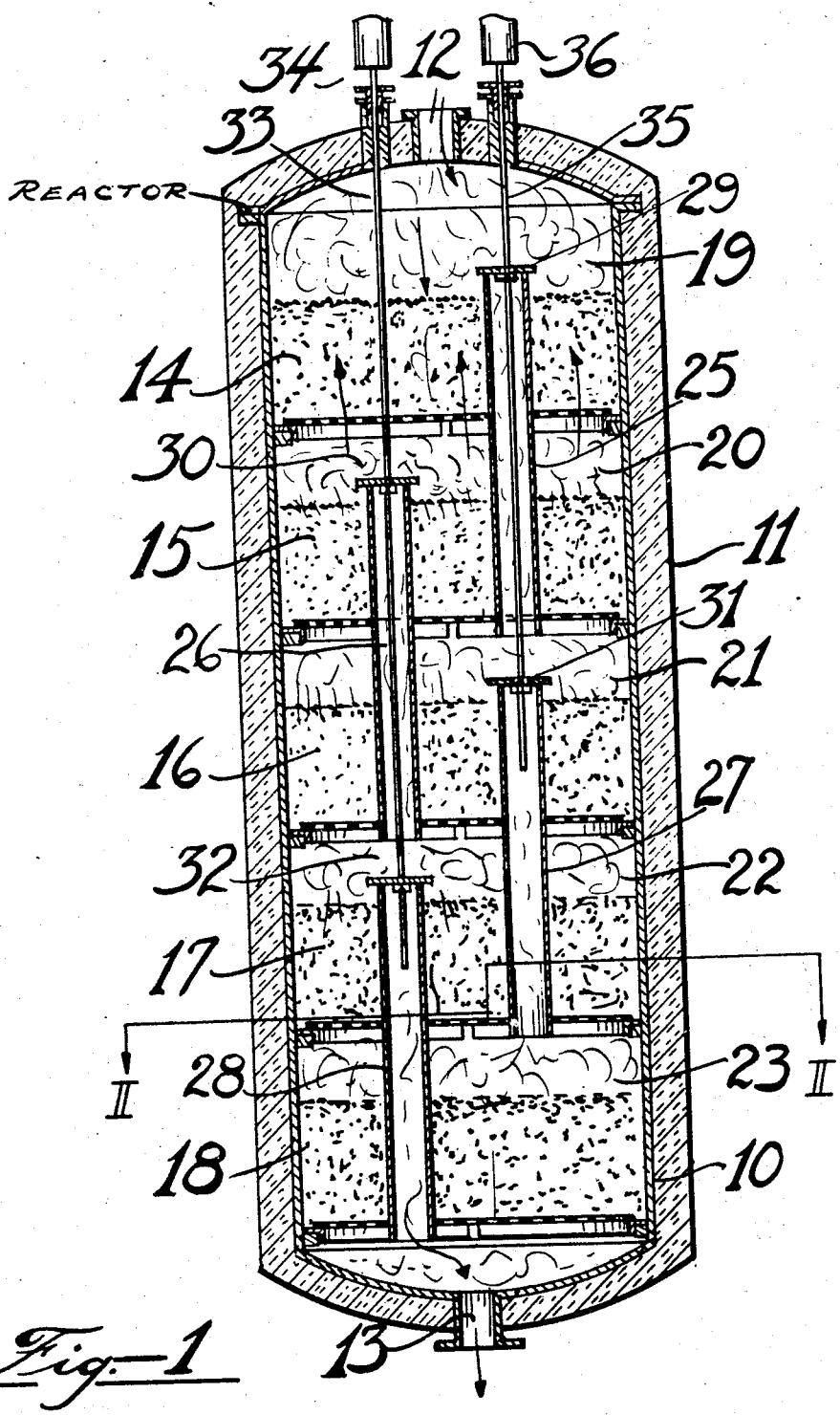

Patented June 10, 1941

2,245,145

UNITED STATES PATENT OFFICE 2,245,145

REACTION CHAMBER

Homer J. Hall, Roselle, and Nicholas Menshih, Cranford, N. J., assignors to Standard Oil Development Company, a corporation of Delaware Application October 12, 1938, Serial No. 234,552

4 Claims. (Cl. 23—288)

This invention relates to reaction chambers containing a plurality of spaced beds of solid contact material supported therein and pertains more particularly to a reaction chamber of this type wherein it is desired to pass products through the separate contact masses in series during certain periods of operation and to pass products through the individual catalyst mass in parallel during the other periods of operation.

While the invention in its broader phases will have a more general application as will be apparent hereinafter, it is particularly adapted for the treatment of hydrocarbon oils wherein the oil to be treated is passed through a solid contact mass, such as a catalyst, for example. During such treatments, the contact mass gradually becomes fouled with carbonaceous or tarry deposits which must be periodically removed to restore the activity of the mass. In certain types of treating operations, deposits of tar or heavy polymers can be removed from the contact mass by flushing with suitable solvents. In other cases, carbonaceous deposits are to be removed from the mass by passing an oxidizing gas, such as for example, air or air diluted with inert gas, such as steam or spent combustion gases, through the mass and burning off the carbonaceous deposits. When employing a reaction chamber containing stationary beds of catalyst mass, it is necessary to periodically interrupt such treating processes in order to regenerate the mass. During the regenerating cycle, it is desirable to pass large volumes of the regenerating fluid through the mass in the shortest possible time in order to reduce the time the reaction chamber is out of operation. However, the resistance of the contact mass to the flow of liquid or gases therethrough increases as the square of the velocity. The question of pressure drop is more particularly important where a mixture of gases is used as the regenerating medium. In view of this, it is desirable to pass the regenerating gas through the individual contact masses in parallel so that large volumes can be passed through per unit time at lower velocities. During the treating cycle, however, the degree of the treatment depends upon the length of time the oil is in contact with the mass. To obtain the desired degree of treatment without reducing the velocity of the oil to be treated to a point which will produce unequal distribution of the oil through the catayist mass, it is desirable during this period to pass the oil through the separate masses in series.

It has heretofore been proposed to provide a reaction chamber constructed and arranged so as to permit flow of products through the reactor either in series or in parallel. According to prior constructions, however, one or more separate lateral connections leading from the reaction chamber were necessary for introducing and removing the products passing in parallel through the chamber. Such lateral connections are objectionable in that they introduce serious construction and maintenance problems. This is particularly true when the vessel is operated under high temperatures or pressure.

The object of the present invention is to provide a reaction chamber more simple in design and more economical to build and maintain than reaction chambers of similar type heretofore constructed. A further object of the invention is to provide a reaction chamber containing a plurality of spaced beds of solid contact material in which the flow of products through the reactor may be in series or in parallel without the necessity of providing any lateral connections to the chamber.

Another object is to arrange such a reactor, suited for flow in series or in parallel through successive contact beds, in such a manner that all piping and valve connections are at the two ends of the reaction chamber. A still further and related object is to so construct this chamber that only a single inlet pipe and a single outlet pipe are required, one at each end of the series of beds and that the same set of inlet and outlet pipes may serve for flow in the same direction or in the reverse direction while flow through the beds within the chamber is in series or in parallel.

Various other objects and advantages of the invention will be apparent from the more detailed description hereinafter, in which reference will be made to the accompanying drawings.

Figure 2:
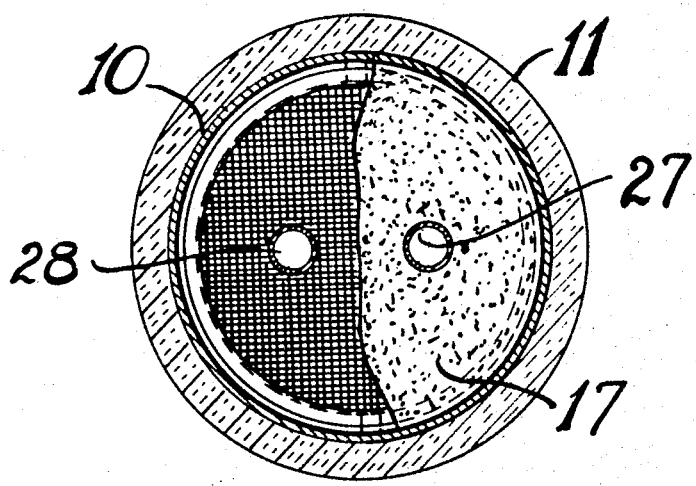

In the drawings, Fig. 1 is a vertical sectional view of a reaction chamber constructed in accordance with the invention and Fig. 2 is a horizontal sectional view of a complete reactor taken along the line II—II of Fig. 1.

Referring to the drawings, the numeral 10 designates an outer metal shell which may be provided with suitable insulation 11. Products to be reacted are introduced into one end of the reactor through conduit 12 and the reaction products are removed from the opposite end of the reactor through conduit 13. As shown, the inlet conduit is at the top of the reaction chamber and the outlet conduit is at the bottom. It will be apparent, however, that either conduit may be used as an inlet and the opposite as an outlet.

Positioned within the reactor 10 is an odd number of beds of solid contact material 14, 15, 16, 17 and 18, supported on perforated grid plates removably mounted on the outer shell of the reaction chamber. The separate beds of solid contact material are spaced from each other and from the ends of the reaction chamber to form vapor spaces 19, 20, 21, 22, 23 and 24. Extending between alternate vapor spaces are internal vapor conduits 25, 26, 27 and 28 which are provided with suitable valves, such as valve caps 29, 30, 31 and 32 respectively. Valve caps 30 and 32 for vapor conduits 26 and 28 respectively, may be operated by a single valve stem 33 extending longitudinally of the tubes and projecting through stuffing boxes at the top of the outer shell. The valve stem may be raised and closed in any suitable manner such as by means of a hydraulic cylinder 34. Valve caps 29 and 31 for vapor conduits 25 and 27 respectively, may likewise be operated by single valve stem 35 extending longitudinally of the conduits 25 and 27 and projecting through stuffing boxes at the top of the reaction chamber. This valve stem may also be operated by a suitable mechanism, such as a hydraulic cylinder 36. To avoid sticking of the valve caps on the top of the individual vapor conduits, the caps are preferably loosely mounted on the valve stem and lifted by means of a ferrule positioned below the valve caps. While the valves have been illustrated in the form of caps closing the ends of the conduits, it will be understood that other types of valves may be employed such as, for example, butterfly valves.

When it is desired to pass the reaction products through the chamber in series, the valve caps 29, 30, 31 and 32 are in the lower position illustrated in Fig. 1. This closes communication between the alternate vapor spaces of the reaction chamber so that gases entering in one end are forced to pass through the total depth of the individual catalyst beds in series prior to being withdrawn at the opposite end.

When it is desired to pass the products through the separate beds in parallel, the valve stems are raised thus opening valve plates 29, 30, 31 and 32 and providing communication between the alternate vapor spaces. When this is done, the vapor products entering the reaction chamber will be required to pass through only one catalyst bed before being withdrawn from the opposite end of the chamber. For example, assuming the gases to be introduced into the upper vapor inlet 12, the distribution of the gases within the chamber will be as follows:

The one portion of the gases will pass directly through the upper bed 14 thence through vapor conduits 26 and 28 to the outlet 13. The remainder of the vapors introduced will pass through the upper vapor conduit 25 to the central vapor zone 21. From the central vapor zone 21 a second portion of the gases will pass upwardly through the second bed of catalyst 15 thence through vapor conduits 26 and 28 to the outlet 13. A third portion of the gases from the central vapor zone 21 will pass downwardly through the third catalyst bed 16, thence through vapor conduit 28 to the exit 13. The remainder of the gases will continue downwardly through the vapor conduit 27 to the vapor zone between the two lowest catalyst beds. From here, the gases divide, one fraction passing upwardly through the fourth catalyst bed 17 thence through conduit 28 to the exit 13. The final fraction of the gas will pass directly downwardly through the bottom catalyst bed 18 and thence be withdrawn through the conduit 13.

With this arrangement, the vapors entering one end of the reaction chamber may travel through only one bed before escaping through a free path to the outlet at the other end. The pressure difference between the initial vapor 19 and the outlet vapor zone 24 will be equal to the resistance imposed by a single catalyst bed plus the resistance imposed by the internal conduits 25, 26, 27 and 28. The resistance of the conduits, however, is negligible as compared to the resistance of the beds. To obtain uniform distribution during parallel flow, the pressure drop through the individual beds should be substantially the same. In order to equalize this pressure drop through the various beds, due consideration must be given to the relative diameters of the internal pipes, which carry different volumes of gas in different positions. It may also be desirable in certain cases to use dummy piping, to change the cross sectional area or increase the thickness of the mass in certain beds for this same purpose. In the drawings, the internal conduits 25, 26, 27 and 28 are shown of uniform diameter even though conduits 25 and 28 are adapted to carry three times the volume of gases passing through conduits 26 and 27. It will be understood, however, that the size of the conduits may be made proportional to the volume of gases passing therethrough. When employing conduits of different size, however, further adjustments must be made to insure uniform resistance to the flow of fluids through all beds.

It will thus be apparent that by the provision of an odd number of catalyst beds within the reaction chamber combined with the provision of valved internal vapor conduits, arranged in such manner as to make possible free communication between alternate vapor zones and one end of the reaction chamber and free communication between immediate vapor zones and the opposite end of the reactor, by simple operation of such valves, the products may be passed either in parallel or in series flow through the individual beds. If an even number of beds within the reactor is employed, it is not possible to obtain both series and parallel flow through the separate catalyst beds without the provision of at least one lateral connection. Likewise, without the provision of internal distributing conduits arranged as just described, it is not possible to avoid lateral connections.

For purpose of illustration, a reaction chamber containing five beds of solid contact material have been shown. It will be understood, however, that any odd number of beds may be employed. The invention makes it possible to subdivide the catalyst mass within the reactor into any suitable odd number of individual beds for parallel flow without requiring any additional outside connections other than a single inlet and outlet. The same basic principle can, of course, be applied to a horizontally disposed reactor by suitable modifications of the internal valving.

While the invention has been described in connection with treatment of hydrocarbon oils and especially catalytic cracking involving alternate reacting and regenerating cycles where it finds particular application, it will be apparent that the invention in its broader phases will have application in other cases where it is desired to pass products through the individual beds either in series or in parallel. In certain cases it may be desirable to use parallel flow during the treating period and series flow during regeneration, to increase the fluid handling capacity of the apparatus, while the contact mass is on stream, or the change from series to parallel flow may be made without changing the character of the fluid passing through the apparatus, to give a similar change in its handling capacity. It will also be apparent that the invention is not restricted to the employment of any specific type of solid contact material and that such material may be either of catalytic or non-catalytic nature.

Having thus described the invention, it is understood that it embraces such other variations and modifications as come within the spirit and scope thereof.

We claim:

1. A reaction chamber adapted to contain a plurality of beds of solid contact material comprising an outer shell forming an enclosed chamber, a conduit at one end of said chamber connected with said shell for introduction of products to be reacted into said chamber, a second conduit at the opposite end of said chamber for removing the reaction products, an odd plurality of beds of contact material supported within the chamber spaced from each other to form free zones therebetween, conduits mounted within said reaction chamber connecting alternate free zones with one end of said reaction chamber and separate conduits mounted within said reaction chamber connecting the free zones intermediate said alternate free zones with the opposite end of said reaction chamber valves for each of said conduits so constructed and arranged that products to be reacted may be introduced into one end of said reaction chamber, thereafter pass through the individual beds in parallel and be removed from the opposite end of said reaction chamber.

2. A reaction chamber adapted to contain a plurality of beds of solid contact material comprising an outer shell forming an enclosed chamber, a conduit at one end of said chamber connected with said shell for introduction of products to be reacted into said chamber, a second conduit at the opposite end of said chamber for removing the reaction products, an odd plurality of beds of contact material supported within the chamber spaced from each other to form free zones therebetween, conduits mounted within said reaction chamber connecting alternate free zones with one end of said reaction chamber, separate conduits mounted within said reaction chamber connecting the free zones intermediate said alternate free zones with the opposite end of said reaction chamber, valves for each of said conduits and means without said chamber for operating said valves to open and close communication through said conduits so constructed and arranged that by operation of said valves, products introduced into one end of said chamber can be selectively passed either in series or in parallel through the individual beds of contact material and withdrawn from the opposite end of said chamber.

3. A reaction chamber adapted to contain a plurality of beds of solid contact material comprising an outer elongated casing forming an enclosed chamber, conduit connections at the opposite ends of said casing for the introduction and removal of fluids to be reacted, an odd plurality of foraminous partitions arranged in spaced relation longitudinally of said casing and adapted to separate said chamber into a plurality of communicating zones, each of said zones being adapted to contain a bed of solid contact material, tubular members extending longitudinally within said chamber having openings providing communication between alternate zones and one end of said casing, additional tubular members extending longitudinally within said casing and having openings providing communication between zones intermediate said alternate zones and the opposite end of said chamber whereby fluids introduced at one end of said casing may be passed through the separate zones in parallel and in opposite directions through adjacent beds of contact material, valves adapted to close the openings in said tubular members and means disposed outside of said casing for operating said valves so that fluids may be caused to pass in series through the individual beds of contact material.

4. A reaction chamber adapted to contain a plurality of beds of solid contact material comprising an outer elongated casing forming an enclosed chamber, conduit connections at opposite ends of said casing for introduction and removal of fluids to be reacted, an odd plurality of foraminous partitions arranged in spaced relation longitudinally of said chamber and adapted to separate said chamber into a plurality of communicating zones, each of said zones being adapted to contain a bed of solid contact material, open-ended tubular members arranged in coaxial alignment within said chamber providing communication between alternate zones and one end of said casing, further open-ended tubular members arranged in coaxial alignment within said chamber and providing communication between zones intermediate said alternate zones with the opposite end of said chamber, valves disposed at the ends of said tubular members, valve stems connected to said valves extending longitudinally of said tubular members and through said casing and means outside of said casing for actuating said valve stems to open and close said valves to thereby cause fluids introduced into one end of said reactor to pass either in series or in parallel through the individual beds of contact material.

HOMER J. HALL.
NICHOLAS MENSHIH.